United States Patent [19]
Vance

[11] 3,746,620
[45] July 17, 1973

[54] WATER SOLUBLE FLUX COMPOSITION
[75] Inventor: Gary R. Vance, East Brunswick, N.J.
[73] Assignee: N L Industries, Inc., New York, N.Y.
[22] Filed: July 13, 1971
[21] Appl. No.: 162,302

[52] U.S. Cl. .................................. 148/23, 148/26
[51] Int. Cl. ............................................ B23k 35/34
[58] Field of Search ........................ 148/22, 23, 24

[56] References Cited
UNITED STATES PATENTS

| | | | |
|---|---|---|---|
| 2,664,370 | 12/1953 | Snell | 148/23 |
| 3,074,158 | 1/1963 | Finnegan | 148/26 |
| 3,264,146 | 8/1966 | Marks | 148/23 |
| 2,805,970 | 9/1957 | McBride | 148/23 |
| 2,427,966 | 9/1947 | Hirschler | 148/24 |
| 3,309,239 | 3/1967 | Harris | 148/23 |
| 3,149,007 | 9/1964 | Chamer | 148/24 |
| 3,073,270 | 1/1963 | Johnson | 148/24 |

FOREIGN PATENTS OR APPLICATIONS
553,553   5/1943   Great Britain ........................ 148/23

OTHER PUBLICATIONS
Wertheim, "Textbook of Organic Chemistry," pp. 139 & 146 (1945).

*Primary Examiner*—L. Dewayne Rutledge
*Assistant Examiner*—Peter D. Rosenberg
*Attorney*—Robert L. Lehman et al.

[57] ABSTRACT

A water soluble flux composition has been prepared for treating metal surfaces, such as printed circuit boards and the like. The composition comprises butyl cellosolve, a nonionic surface active agent, an activator and an aliphatic alcohol. This composition also is capable of producing a heavy foam flux composition which has excellent stability.

6 Claims, No Drawings

WATER SOLUBLE FLUX COMPOSITION

BACKGROUND OF THE INVENTION

Many types of fluxes have been prepared for the soldering industry. One type which is of particular interest in the industry is a water soluble acid type of flux that may be used as a coating for printed boards and the like. One particular disadvantage of the water soluble type of flux is that the vehicle is violently released during the soldering operation from the flux composition.

SUMMARY OF THE INVENTION

A water solbule flux composition has been prepared comprising butyl cellosolve, a nonionic surface active agent, an activator and an aliphatic alcohol. The cellosolve is present in amount from 10 percent to 40 percent, the surface active agent is present in amount from 1 percent to 10 percent, the activator from 0.25 percent to 8.0 percent and the aliphatic alcohol being present in amount from 50 percent to 90 percent. This composition may also contain methyl myristate if desired in amounts from 0 percent to 2 percent.

DESCRIPTION OF THE PREFERRED EMBODIMENT

The flux composition of the instant invention may be brushed or sprayed onto the surface to be treated or the metal surface may be dipped into the flux system.

This particular flux composition also may be used as a foam fluxing system. In such a system the flux composition is aerated to form a heavy foam and the article to be treated is passed through the foam in order to apply evenly the flux which has excellent stability.

The instant flux composition forms a flux system which produces a non-corrosive, water soluble residue.

The nonionic surface active agent used in the composition of the instant invention is a water soluble amine polyglycol condensate. This particular agent may be obtained from Rohm and Haas under the Tradename "Triton CF-32."

The activator for the solder flux composition may be an amine hydrochloride, such as dimethyl amine hydrochloride, $\alpha$-bromo-myristic acid, hydrochloric acid or ammonium halides and the like. One or more activators may be used in the instant composition.

The alcohols used are the lower aliphatic alcohols including methyl, ethyl, propyl, isopropyl, butyl, isobutyl, sec-butyl and the like. When the instant compositions are used for foam applications, the high molecular weight alcohols may be used since they do not evaporate as quickly as the lower molecular weight alcohols do. For improved wetting properties a combination of alcohols is preferred.

In order to describe the composition of the instant invention in more detail, the following examples are presented:

EXAMPLE 1

72 grams of methyl alcohol were placed in a closed container. With agitation the following ingredients were added to the alcohol:

| GRAMS | INGREDIENTS |
|---|---|
| 20 | butyl cellosolve |
| 1 | methyl myristate |
| 4 | amine polyglycol condensate |
| 1 | hydrochloric acid |
| 3 | dimethylamine hydrochloride |

The amine polyglycol condensate used in this application is "Triton CF-32," which was identified above.

After mixing for 1 hour, this solution was brushed onto the surface of a printed circuit board. The treated printed circuit board was then dip soldered, allowed to cool and washed thoroughly with water to remove the water soluble residue.

After subjecting the circuit board to a humidity chamber at 80° F at 80 percent relative humidity for 24 hours, the board was examined for corrosion and found to be free from corrosive products.

EXAMPLE 2–7

The procedure of Example 1 was repeated using various quantities of agents. The ingredients used were as follows:

| Ingredients Used | Example No. | | | | | |
|---|---|---|---|---|---|---|
| | 2 | 3 | 4 | 5 | 6 | 7 |
| % Butyl Cellosolve | 20 | 20 | 30 | 30 | 30 | 30 |
| % Methyl Alcohol | 70 | 72 | 62 | 56 | 59 | 58 |
| % Amine Polyglycol Condensate | 5 | 3 | 3 | 7 | | 6 |
| % Hydrochloric Acid | 1 | 1 | 1 | 1 | 1 | 1 |
| % Amine Hydrocloride | 3 | 3 | 3 | 5 | 5 | 5 |
| % Methyl Myristate | 1 | 1 | 1 | 1 | - | - |

In all of these example the composition was used as a flux on the metal to be soldered and the residue formed was water soluble and noncorrosive.

In order to show that the flux composition of the instant invention may be used as a foam fluxing agent, the flux composition of Example 2 was used as follows:

100 ml. of the water soluble flux solution prepared in Example 2 was placed at one end. Air, at 5 psig. and 2.5 cu. ft. per hour was passed up through the fritted tube which caused the flux solution to foam. The foam head was measured and after 7 hours, the volume of the flux solution was recorded.

The results of this test showed that the flux had excellent foam stability. After 7 hours there was no loss in the foam head and the evaporation loss was only 25 percent or 4 ml per hour.

Metal surfaces treated with the foam flux composition were free from corrosion after a soldering and washing treatment.

While this invention has been described and illustrated by the examples shown, it is not intended to be strictly limited thereto, and other variations and modifications may be employed within the scope of the following claims.

I claim:

1. A water soluble noncorrosive flux composition comprising butyl cellosolve, a nonionic surface active agent, an activator and an aliphatic alcohol in which the amount of butyl cellosolve is from 10 percent to 40 percent, the amount of surface active agent is from 1 percent to 10 percent, the activator is from 0.25 percent to 8.0 percent and the alcohol from 50 percent to 90 percent all of the percentages being expressed by weight.

2. Composition according to claim 1 which also contains methyl myristate in amount from 0 percent to 2 percent.

3. Composition according to claim 1 in which the surface active agent is a water soluble amine polyglycol condensate.

4. Composition according to claim 1 in which the activator is amine hydrochloride.

5. Composition according to claim 1 in which both amine hydrochloride and hydrochloric acid are used as the activator.

6. Composition acording to claim 1 in which the alcohol is methyl alcohol.

* * * * *